United States Patent [19]

Cooper

[11] 3,841,647
[45] Oct. 15, 1974

[54] SELF-CENTERING CHUCK MECHANISM
[75] Inventor: Cleveland N. Cooper, Kirkwood, Mo.
[73] Assignee: The Pandjiris Weldment Co., St. Louis, Mo.
[22] Filed: Jan. 10, 1973
[21] Appl. No.: 322,378

[52] U.S. Cl............... 279/110, 279/1 L, 279/112, 279/119
[51] Int. Cl............................................. B23b 31/16
[58] Field of Search............ 279/112, 110, 119, 1 L; 269/218

[56] References Cited
UNITED STATES PATENTS
2,464,070  3/1949  Carcelli............................. 279/1 L
3,156,480  11/1964  Wuesthoff.......................... 279/119
3,416,809  12/1968  Cooper.............................. 279/110

FOREIGN PATENTS OR APPLICATIONS
846,162  9/1952  Germany........................... 279/110

Primary Examiner—Gil Weidenfeld

[57] ABSTRACT

This chuck mechanism includes a frame having an actuator oscillatively mounted about the frame center and connected to a plurality of slide members each carrying a clamping jaw. Link members are connected between associated pivot axes on the actuator and associated slide members to provide the jaws with generally radial movement toward and away from the frame center accompanied by a relatively small lateral movement. The jaws include clamping faces engaging a cylindrical workpiece tangentially to hold the workpiece in concentric alignment with the frame center.

8 Claims, 12 Drawing Figures

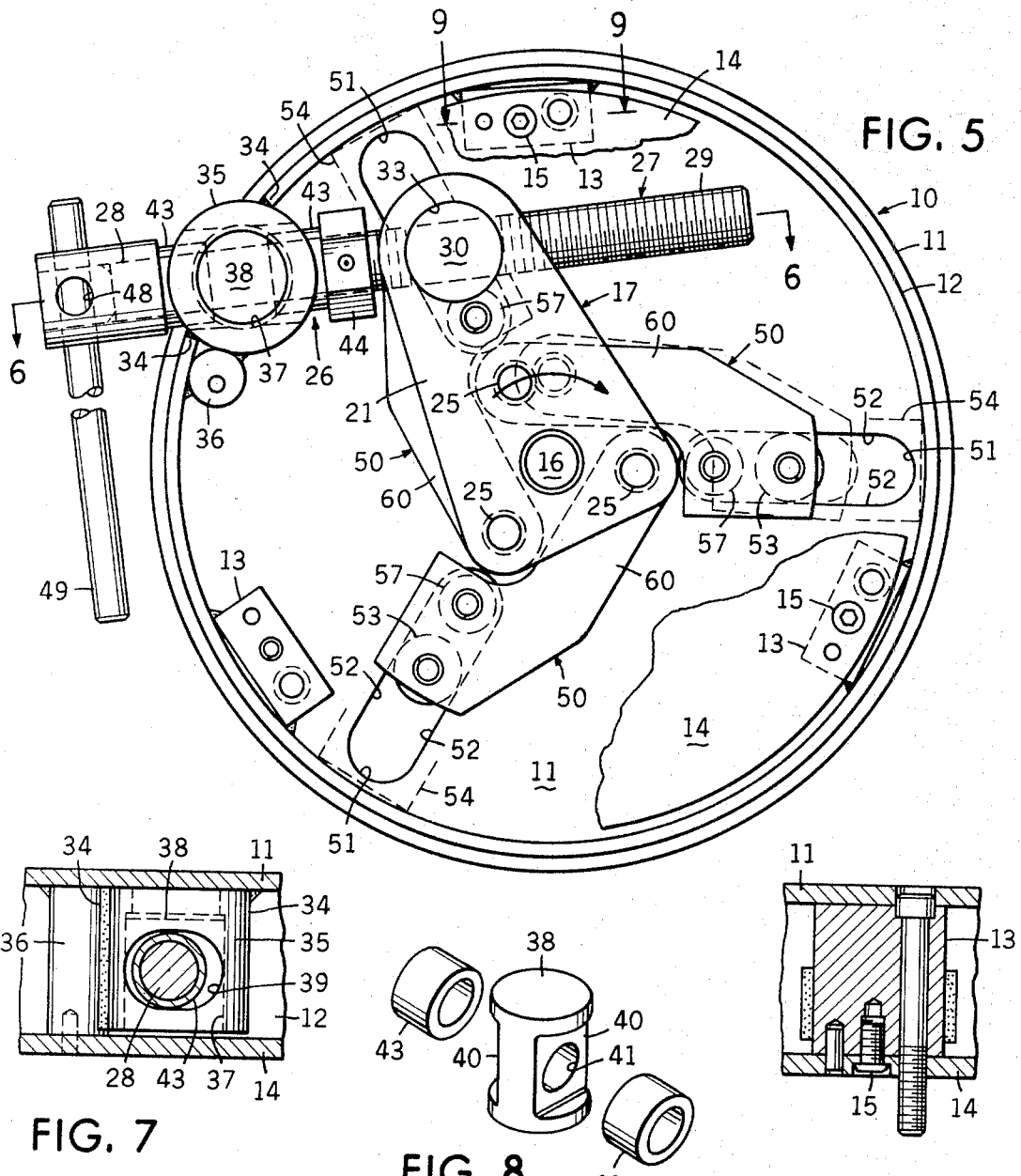
FIG. 5
FIG. 7
FIG. 8
FIG. 9
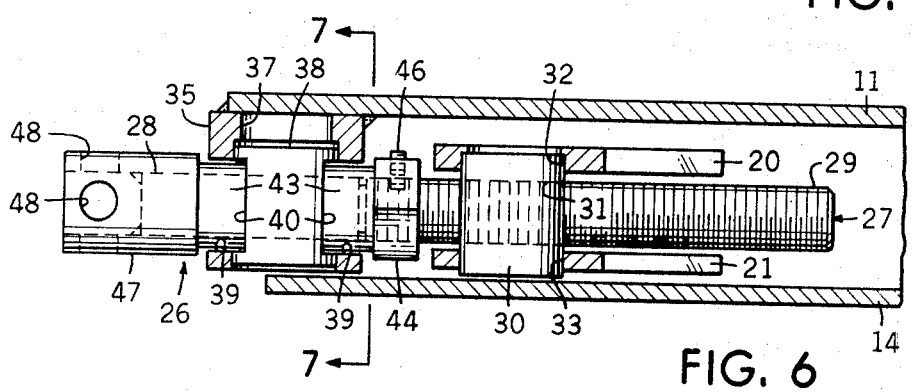
FIG. 6

SELF-CENTERING CHUCK MECHANISM

BACKGROUND OF THE INVENTION

This invention relates generally to self-centering chuck mechanisms and more particularly to an improved three-jaw chuck adapted to hold and position a workpiece during welding operations.

Certain features of the present disclosure are described and claimed in U.S. Pat. No. 3,156,480 issued Nov. 10, 1964 and entitled "Self-Centering Chuck Mechanism" and U.S. Pat. No. 3,416,809 issued Dec. 17, 1968 and entitled "Self-Centering Chuck Mechanism" both owned by the common assignee. Devices of the class described herein are used chiefly for the holding in place of cylindrical tanks, during welding operations and the like, by exerting clamping pressure against the tank walls. Both of the prior chuck mechanisms referred to above utilize an oscillative actuator, which is rotated by means of a screw jack, and which is coupled to radially reciprocative sliding chuck jaws.

In the first of the devices referred to above, the transfer of forces from the actuator to the sliding jaws is by means of cam connections, which depend for their action on engagement between cylindrical pins against the flat sides of slots receiving the pins. This arrangement limits the clamping force to that which will not indent the contact surfaces of the pins or the flat sides with a consequent loss of accuracy and smooth operation. The mechanism requires close tolerances for many of its parts to achieve a high degree of self-centering accuracy.

The second device is an improvement over the first and reduces the number of components, which results in substantial savings in manufacturing costs. However, this device utilizes sliding keyway connections by which force is transferred from the actuator to the sliding chuck jaws. This means of force transfer, although simplified in comparison with the cam connection of the first device, is affected significantly by the friction losses. In addition, this device is subject to abuse by unreasonable tightening, resulting in damage to operating parts.

In both of the prior devices the force transferred throughout the working stroke changes considerably and the clamping jaw faces must be maintained in strict radial alignment.

The present device overcomes the above deficiencies and represents a significant improvement over known prior devices.

SUMMARY OF THE INVENTION

This invention provides a chuck-centering mechanism in which the number of parts is considerably reduced because of the nature of the connection between the actuator and the sliding jaws. Further, the mechanism has been considerably simplified over prior devices.

These advantages are possible because the connection between the actuator and the sliding jaws is achieved with a minimum of sliding parts. In addition, and importantly, the structural arrangement of parts is such that the jaw clamping faces are permitting a slight combination of lateral angular motion during the working stroke. However, notwithstanding this lateral motion the jaw contact is maintained tangential to a cylindrical workpiece and the slight departure from longitudinal, radial motion has no practical disadvantage.

It is an important object of this invention to provide a frame having a central axis and a plurality of jaw carrying slide members mounted to the frame, each slide member including pivot means defining a pivot axis reciprocatively movable toward and away from the frame axis, the jaws selectively oscillating about said pivot axis during said reciprocative movement.

Another important object is achieved by providing an actuator, oscillatively mounted to the frame for movement about the frame axis and including a plurality of pivot means each defining a pivot axis spaced equidistant from said frame axis and oscillatable about said frame axis.

A most important object of this invention lies in the provision of a plurality of link members interconnecting the actuator pivot means to associated slide member pivot means to provide generally linear movement of the slide member pivot axis radially of the frame axis accompanied by a slight rotational movement of the link member about the slide member pivot axis as the actuator oscillates.

It is an object to provide a frame which includes a plurality of pairs of opposed guide shoulders each pair cooperating with an associated slide member pivot means to guide the reciprocative movement of the slide member.

A particular object is achieved in that the pivot means of each slide member includes a guide element and the guide shoulders are provided by a plurality of elongate, radially extending pairs of slots each pair receiving an associated guide element in sliding relation.

Another important object is attained in that each slide member is fixedly attached to an associated link member so that oscillative movement of the link member about the slide member pivot axis is experienced by the slide member and by the jaw carried by the slide member.

It is an important object of the invention that each jaw includes a clamping face having a point of tangential contact on a common clamping circle selectively offset from the radial path of the pivot means as the slide member reciprocates.

An important object is to provide a chuck mechanism that is simple in construction and easy to operate by anyone without special instruction.

BRIEF DESCRIPTION OF THE DRAWINGS

FIG. 5 is a bottom plan view of the chuck mechanism showing the component parts with the slide members fully retracted;

FIG. 6 is an enlarged cross sectional view taken along line 6—6 of FIG. 5, and inverted for clarity;

FIG. 7 is a fragmentary cross sectional view taken along line 7—7 of FIG. 5;

FIG. 8 is an exploded perspective view of the cylindrical pivot pin and sleeves utilized in mounting the actuating screw shaft;

FIG. 9 is a fragmentary cross sectional view taken along line 9—9 of FIG. 5, and inverted for clarity;

Figure 1:
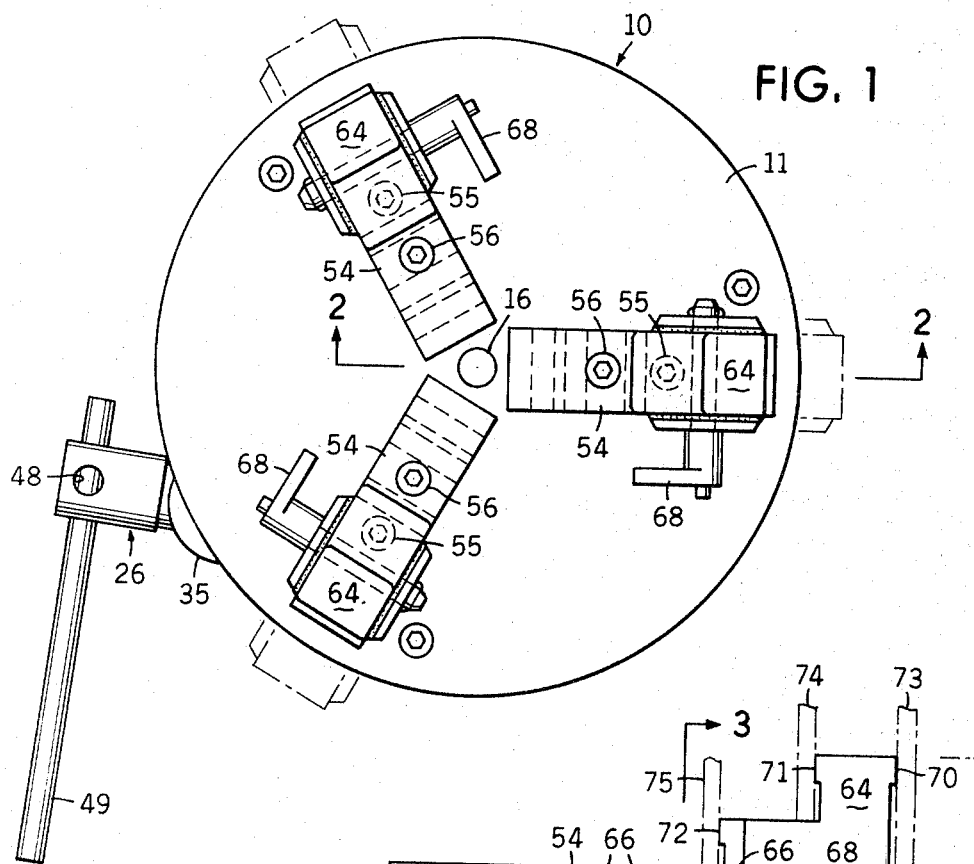
FIG. 1 is a top plan view of the chuck mechanism.
Figure 2:
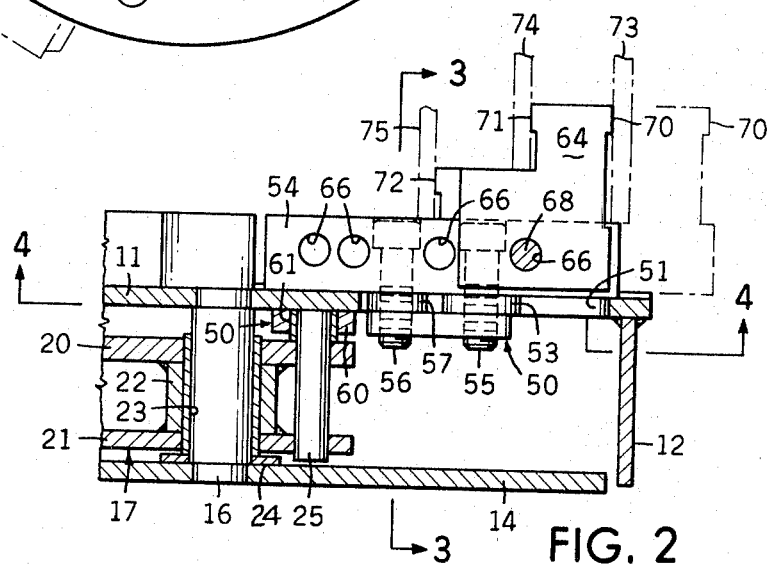
FIG. 2 is a fragmentary cross sectional view taken along line 2—2 of FIG. 1.
Figure 3:
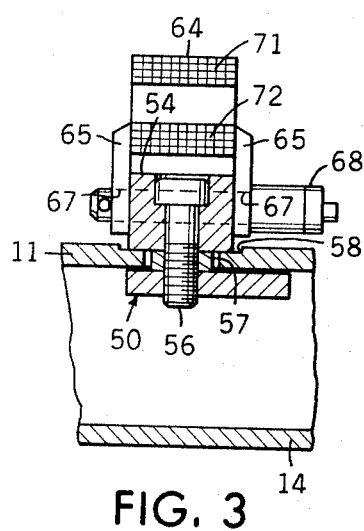
FIG. 3 is a fragmentary cross sectional view taken along line 3—3 of FIG. 2.

DESCRIPTION OF THE PREFERRED EMBODIMENT:

Referring now by characters of reference to the drawings and first to FIGS. 1, 2 and 5, it will be understood that the self-centering chuck device includes a substantially cylindrical frame, generally indicated by numeral 10, having a top plate 11 and a peripheral side apron 12. A plurality of inwardly extending brackets 13 are secured to the inside face of the side apron 12, and a bottom plate 14 is secured to the brackets 13, as by screws 15, all as shown in FIGS. 5 and 9.

The cylindrical frame 10 includes a common central axis defined by a pin 16, which extends between the top plate 11 and the bottom plate 14. Rotatively mounted on the pin 16, between the top plate 11 and the bottom plate 14, is an actuator generally indicated by numeral 17.

Figure 10:
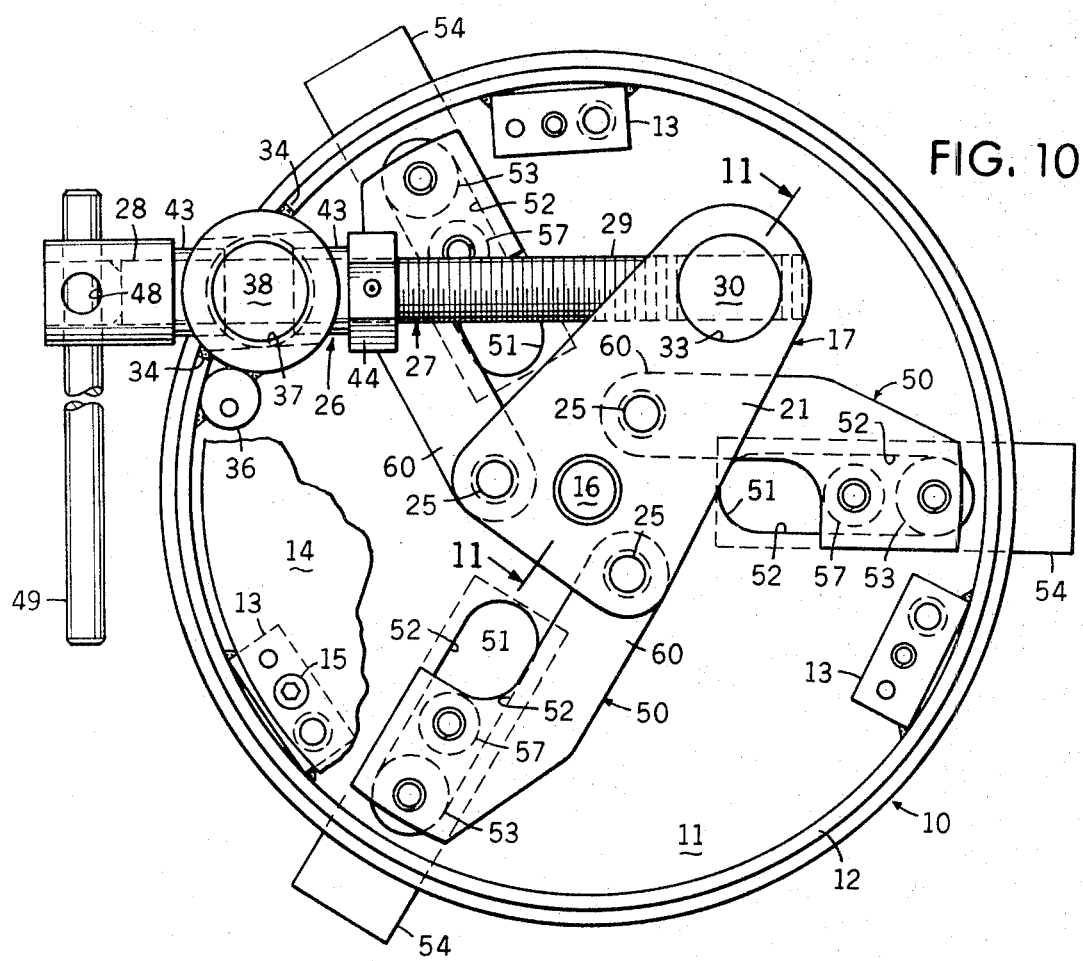
FIG. 10 is a bottom plan view of the chuck mechanism, similar to FIG. 5, but showing the component parts with the slide members fully extended.
Figure 11:
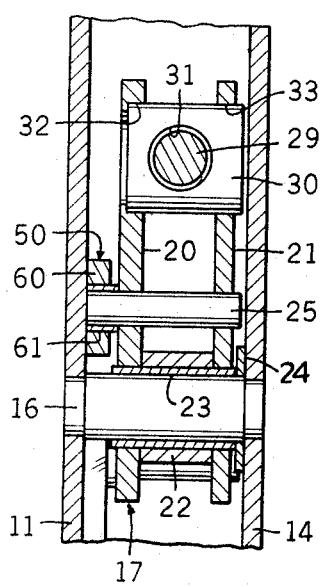
FIG. 11 is a fragmentary cross sectional view taken on line 11—11 of FIG. 10 illustrating the actuator.

The actuator 17 is best understood from FIGS. 2, 10 and 11 and includes a pair of spaced plates 20 and 21, which are interconnected by a spacer 22. The actuator 17 also includes a tubular bushing 23, which extends through actuator plates 20 and 21 and the intervening spacer 22. The bushing 23 receives and is rotatively mounted on the pin 16. A spacer washer 24 is disposed between the lower end of the bushing 23 and the bottom plate 14. The actuator 17 also includes a plurality of pin elements 25, three in number in the preferred embodiment, which are disposed equidistant from the axis of the pin 16, and at 120 degrees spacing from each other. The pins 25 constitute actuator pivot means and extend between plates 20 and 21 and project outwardly of plate 20 to connect to an associated link member 50 in journal relation. As will be described, the link members 50 connect the actuator 17 to jaw-carrying slide members 54 so that oscillation of the actuator 17 about the pin 16 induces reciprocative motion into said slide members toward and away from said pin 16.

As best shown in FIGS. 5 through 9, the actuator 17 is rotated about the pin 16 by means of a threadedly related shaft assembly generally indicated by numeral 26. To this end the actuator 17 is provided with a cylindrical nut 30 outwardly disposed of the pin 16 and rotatable on an axis aligned in the same direction with and parallel to the axis defined by said pin 16. The shaft assembly 26 includes an elongate shaft 27 having an unthreaded portion 28 and a threaded portion 29, and the cylindrical nut 30 includes a threaded bore 31 adapted to receive said threaded portion 29, whereby rotation of the shaft 27 oscillates the actuator 17. As shown in FIG. 11 the actuator plates 20 and 21 include associated journal apertures 32 and 33 receiving and retaining the cylindrical nut 30.

The shaft assembly 26 is pivotally mounted to the cylindrical frame 10 as best shown in FIGS. 5 through 8.

As particularly shown in FIGS. 5 and 7, the side apron 12 includes a gap defined by spaced apron ends 34, and a cylindrical post 35 is welded, or otherwise attached, between said ends and to the top plate 11. To further secure the cylindrical post 35 a cylindrical reinforcing element 36 is welded, or otherwise attached, to the post 35 and to the inside face of the apron 12, and said element 36 provides an additional connection point for the bottom plate 14. The post 35 is provided with a bored hole 37, which receives and retains a rotatively mounted pivot pin 38, as clearly shown in FIG. 8. As shown in FIG. 7 the cylindrical post 35 includes a pair of transversely aligned oval-shaped holes 39, and the pivot pin 38 is provided with opposed flats 40 having a bored hole 41 extending therebetween to receive the unthreaded portion 28 of the shaft 27. As best shown in FIGS. 5 and 6 the shaft assembly 26 includes a pair of spacer elements 43 which, as shown in FIG. 7, are received within associated oval-shaped holes 39 and abut associated flats 40. FIGS. 5 and 10 illustrate the actuator 17 in the fully retracted and fully extended conditions respectively and it will be readily understood that the oval-shaped holes 39 permit the shaft 27 and the pivot pin 38, through which it extends, to be pivoted relative to the post 35. The shaft 27 is rotatable within the pivot pin 38 but is longitudinally restrained. To this end the shaft assembly 26 includes a nut 44 and an outer sleeve 47. The nut 44 is fixed to the shaft threaded portion 29 by means of a pin 46 and the sleeve 47 is welded, or otherwise attached, to the shaft unthreaded portion 28. The sleeve 47 includes a plurality of apertures 48 which are circumferentially spaced in opposed pairs of a size to receive a handle bar 49, by which the shaft 27 is turned.

As will be clear from FIGS. 5 and 10 rotation of the shaft 27 relative to the actuator cylindrical nut 30 results in longitudinal movement of said cylindrical nut 30 relative to said shaft 27, and rotation of said nut 30 within its mountings in the actuator top and bottom plates 20 and 21.

Figure 4:
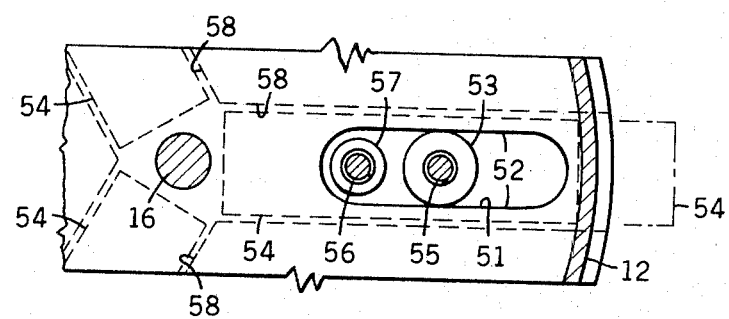
FIG. 4 is a fragmentary cross sectional view taken along line 4—4 of FIG. 2.

Oscillation of the actuator 17 by means of the shaft assembly 26 induces reciprocative motion into the jaw-carrying slide members 54 as will now be described. The top plate of the frame 10 is provided with a plurality of elongate, relatively narrow guide slots 51, three in number in the preferred embodiment, each extending radially of the axis of the frame and each defined by parallel sides or shoulders 52. The guide slots 51 constitute guide means and serve to determine the path followed by associated links 50. As shown in FIGS. 2 and 4 each link member 50 is fixedly connected to its associated slide member 54 by spaced fasteners 55 and 56. Because of these spaced fasteners 55 and 56 each link member 50 moves with its associated slide member 54. The connection between these two members 50 and 54 nevertheless constitutes a slide member pivot means which permits the two members 50 and 54 to pivot in the associated guide slot 51 about a pivot axis defined by fastener 55 for the following reason. Fastener 55 is provided with a spacer 53, which is of substantially the same diameter as the width of the associated slot 51 defined by the spacing of the slot sides 52. This spacer 53, which constitutes a guide element, thereby provides opposed bearing faces slidingly engageable with said slot sides 52. Fastener 56, on the other hand, is provided with a spacer 57, which is of a diameter substantially smaller than the width of the slot 52 thereby permitting lateral movement of said spacer 57 relative to said slot 52. As particularly shown in FIG. 4 the top plate 11 also includes a plurality of grooves 58, which are associated with the slide members 54 and provide a machined surface to facilitate movement of said members relative to the cylindrical frame 10. The grooves 58 are wider than the slide members 54 to permit the lateral movement aforementioned.

As noted above the link members 50 are pivotally connected at their other end to the actuator 17, as shown in FIGS. 2 and 5, by the projecting pins 25, each of which is journal-mounted to a link member offset portion 60, by means of a bushing 61, which receives the associated pin 25. The offset portions 60 are compatibly formed to permit each link member 50 to be disposed in nested relation to an adjacent link member. It will be understood that the effective length of each link member 50 is defined by the spacing of the pivot axes of pins 25 at the actuator end and the associated slide member fastener 55 at the other end. The path of the pivot axis of the fastener 55 is radial and the pivot center moves toward and away from the frame axis as the actuator oscillates about pin 16. The path of the pivot axis of pins 25 is circular. The result of this structural arrangement is that the link members 50 and slide members 54 rotate slightly above the pivot axes associated with the associated fasteners 55 as said spacers 53 traverse the guide slots 51. This rotation is demonstrated in FIG. 5 in which one of the link members 50 is shown in an intermediate position in broken outline to demonstrate the tilt of said member relative to the radially disposed longitudinal axis of the associated guide slot 51.

Each slide member 54 is provided with a movable jaw 64 having depending side plates 65 which straddle said slide member. The slide members 54 each include a series of longitudinally spaced holes 66 extending between the sides thereof, and the depending side plates 65 of each associated jaw 64 include opposed holes 67 adapted to receive a locking pin 68 extending selectively through one of the holes 66 of the slide member 54 to position the jaw 64.

Each jaw 64 is provided with serrations on vertical faces 70, 71 and 72 respectively. As shown particularly in FIG. 2 the serrations on face 70 are adapted to engage a workpiece 73 incident to and exerting an outward pressure. In addition faces 71 and 72 are adapted to engage workpieces 74 and 75 respectively incident to exerting an inward pressure. It will be understood that the workpieces under consideration are commonly cylindrical tank members. In FIG. 2 the jaw 64 is shown in broken outline to indicate the stroke and it will be understood that the jaw can be relatively reversed and this reversal capability results in additional positions of the serrated faces.

Because the jaws 64 are selectively fixed relative to the slide members 54, to which they are connected, said jaws 64 likewise experience a tilting motion relative to the longitudinal axes of associated slots 51. However, although the serrated faces also have a slight combination of lateral angular motion during the working stroke of their associated link members 50, the jaw contact will always be tangential to a circular workpiece and the slight departure from radial motion has no practical disadvantage.

It is thought that the operation and functional advantages of the chuck mechanism have become fully apparent from the foregoing description of parts but for completeness of disclosure the usage of the chuck will be briefly described.

It will be understood that the identical nature of the link members 50 and the connection thereof to the actuator 17 at the same radial distance from the pin 16 results in simultaneous movement of the slide members 54 within the guide slots 51. The inner and outer limits of radial movement of said slide members relative to the top plate 11 are indicated in FIGS. 5 and 10 respectively. FIG. 5 illustrates the fully retracted position and FIG. 10 illustrates the fully extended position. Commencing from the retracted position, rotation of the actuator 17, by means of the shaft assembly 26, is achieved by turning the handle 49, which causes the cylindrical nut 30 to move along the shaft threaded portion 29, thereby rotating the actuator 17 in a clockwise direction about the common frame axis. By virtue of the connecting link members 50 orbital movement of the pins 25 about the frame axis induces translational movement into the spacer elements 53 in the slots 51. The slide members 54 and connected jaws 64 are thus moved away from the pin 16. As will be clear from FIG. 2 this outward movement would result in the application of a clamping force from a serrated face such as face 70 against a workpiece such as workpiece 73. It will be understood that such clamping force, in the preferred embodiment, would be applied at three equally spaced points about the circumference of said workpiece. Because of the nature of the connection a slight rotation of each link member 50 about the pivot axis of the associated fastener 55 is experienced by the link member 50, and also the jaw 64 connected thereto. However, the clamping force is applied tangentially to the workpiece.

It will be understood from FIG. 2 that the shaft assembly 26 provides the faces of the jaw 64 with a movement equivalent to the stroke of the shaft 27, which is defined in the preferred embodiment by engagement between spacers 53 and 57 with opposite ends of the guide slot 51. In effect, this stroke provides a fine adjustment of movement of the jaw 64. Coarse adjustment is achieved by positioning the jaws 64 to correspond with a radial distance from the axis of the pin 16, which most closely approximates the diameter of the specific cylindrical workpiece. By then moving the jaws against the workpiece, sufficient clamping pressure can be applied to the workpiece to hold the workpiece securely in place. It will be readily understood that movement of the actuator 17 in a counterclockwise direction produces an inwardly directed clamping force.

Figure 12:
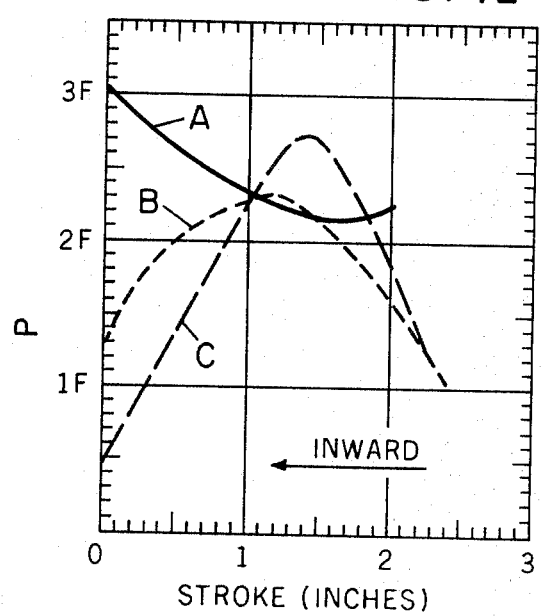
FIG. 12 is a representation, in the form of a chart, illustrating the stroke and load relationships between the present device and specific prior devices.

The proportioning of the various elements of the device is such that the force applied by the shaft assembly 26 to the actuator 17 is a maximum at the commencement of the stroke. FIG. 12 is a representation of the manner in which the clamping force varies over the length of the stroke for three different chuck mechanisms of comparable stroke. Curve A represents the device described herein; curve B represents the device described in U.S. Pat. No. 3,156,480 and curve C represents the device described in U.S. Pat. No. 3,416,809. As will be readily observed the maximum clamping force illustrated by curve A is not only greater than shown by curves B and C but the average clamping force is also greater.

I claim as my invention:
1. In a chuck mechanism:

a. a frame including pivot means defining an axis,
b. a slide member being connected to a pivot means and the slide member being rotatable about the axis of said pivot means,
c. means on said frame for guiding said slide member,
d. said pivot means and said guide means cooperating to support said slide member on the frame for reciprocative and rotary movement relative thereto,
e. a jaw carried by the slide member,
f. an actuator mounted to the frame for oscillative movement about the frame pivot means axis and including pivot means defining a pivot axis spaced from the frame pivot means axis, and
g. link means interconnecting said actuator pivot means to said slide member pivot means or reciprocative movement of the slide member and jaw toward and away from the frame pivot means axis and for rotational movement of the slide member and jaw about the slide member pivot means axis as the actuator oscillates.

2. A chuck mechanism as defined in claim 1, in which:
h. the slide member pivot means includes a guide element having diametrically spaced arcuate bearing faces, and
i. said guiding means includes opposed guide shoulders spaced apart a distance substantially equal to the diametrical spacing of said arcuate faces to receive said arcuate faces of the guide element in reciprocative and rotative sliding relation.

3. A chuck mechanism as defined in claim 1, in which:
h. the path of the slide member pivot means axis is substantially radially disposed of the frame pivot means axis, and
i. the link means is oscillatable with the slide member about the pivot axis of the slide member pivot means as the slide member reciprocates toward and away from the frame pivot means axis.

4. A chuck mechanism as defined in claim 3, in which:
j. the jaw includes a clamping face, and
k. the slide member is fixedly attached to the link means so that the jaw clamping face moves transversely of the radial path of the pivot means axis of the slide member as the link means and slide member oscillate.

5. In a chuck mechanism:
a. a frame including pivot means defining an axis,
b. a plurality of slide members, each of said slide members being connected to a pivot means and the slide member being rotatable about the axis of said pivot means,
c. means on said frame for guiding each of said slide members,
d. each of said pivot means and an associated guiding means cooperating to support each of said slide members on the frame for reciprocative and rotary movement relative thereto,
e. a plurality of jaws, each jaw being carried by an associated slide member,
f. an actuator mounted to the frame for oscillative movement about the frame pivot means axis and including a plurality of pivot means, each of the last said pivot means defining a pivot axis spaced from the frame pivot means axis, and
g. a plurality of link members, each link member extending between and interconnecting an actuator pivot means and an associated slide member pivot means for reciprocative movement of each slide member toward and away from the frame pivot means axis and for rotational movement of each slide member and associated jaw about the slide member pivot means axis as the actuator oscillates.

6. A chuck mechanism as defined in claim 5, in which:
h. each of said guiding means includes a plurality of pairs of opposed guide shoulders, each pair of guide shoulders cooperating with an associated slide member pivot means to guide the reciprocative and rotative movement of the slide member.

7. A chuck mechanism as defined in claim 5, in which:
h. each slide member is fixedly attached to an associated link member, and each slide member pivot means includes a guide element,
i. the distance between the actuator pivot means axes and associated slide member pivot means axes is substantially fixed, and the actuator pivot means axes oscillate about the frame pivot means axis, and
j. the guiding means includes a plurality of elongate, radially extending guide slots, each slot receiving a guide element of an associated slide member in guided relation whereby the path of the pivot means axis of the associated slide member is substantially radially disposed of the frame pivot means axis, and each attached link member and slide member rotates about the pivot means axis of said associated slide member pivot means as the actuator pivot means oscillate about the frame pivot means axis.

8. A chuck mechanism as defined in claim 5, in which:
h. the actuator pivot means axes are equidistant from the frame pivot means axis,
i. each slide member is fixedly attached to an associated link member,
j. the distance between the actuator pivot means axes and associated slide member pivot means axes is substantially fixed, and the actuator pivot means axes oscillate about the frame pivot means axis,
k. the means for guiding said slide member cooperates with the associated slide member pivot means to guide the reciprocative and rotative movement of said associated slide member pivot means in a radial direction relative to the frame pivot means axis, and
j. each jaw includes a clamping face having a point of tangency with a circle concentric with the frame pivot means axis, said point of tangency being selectively offset from the radial path of the pivot axis of the associated slide member pivot means as the associated slide member reciprocates and rotates.

* * * * *